United States Patent [19]

Muehling

[11] 4,070,058

[45] Jan. 24, 1978

[54] INFINITE POSITION SEAT BACK RECLINER

[76] Inventor: Anthony A. Muehling, 14583 Maddelein, Detroit, Mich. 48205

[21] Appl. No.: 732,681

[22] Filed: Oct. 15, 1976

[51] Int. Cl.$^2$ ............................................. A47C 1/027
[52] U.S. Cl. ..................................... 297/374; 74/531; 297/379; 403/92; 403/351
[58] Field of Search ............... 297/374, 355, 354, 379, 297/378; 16/140–142; 74/531; 248/371, 372, 382, 383; 108/6, 8; 403/351, 352, 92, 96, 93; 192/76, 93 R

[56] References Cited

U.S. PATENT DOCUMENTS

| | | | |
|---|---|---|---|
| 2,603,323 | 7/1952 | Muehling | 192/8 R |
| 2,624,396 | 1/1953 | Spraragen | 297/374 |
| 3,416,390 | 12/1968 | Houk | 74/531 |
| 3,515,433 | 6/1970 | Tabor | 297/374 |
| 3,517,965 | 6/1970 | Cowles et al. | 297/374 |
| 3,523,593 | 8/1970 | Karasick | 297/374 X |

*Primary Examiner*—Roy D. Frazier
*Assistant Examiner*—William E. Lyddane
*Attorney, Agent, or Firm*—Reising, Ethington, Barnard, Perry & Brooks

[57] ABSTRACT

A seat recliner including seat back and cushion supports connected about a pivotal axis and positioned relative to each other against pivoting in an infinite position adjustable manner. A housing is fixed to one of the supports and defines a pair of locking surfaces extending about the pivotal axis on opposite sides thereof with curved shapes that have increasing radii from the axis in opposite directions. A pair of cam members pivotal on the housing about the axis have respective cam surfaces that oppose the locking surfaces of the housing from opposite sides of the pivotal axis with curved shapes that have increasing radii in the same direction as their associated locking surfaces. A pair of locking slides are slidably mounted on the other support in a pivotally fixed relationship. Each slide has a first end slidably engaged with one of the locking surfaces on the housing and a second end slidably engaged with the cam surface on the opposite side of the pivotal axis from its first end such that the slides are positioned between the locking and cam surfaces and thereby prevent relative pivoting between the supports in either direction. A spring normally biases the cam members in opposite directions to maintain the slides in a wedged condition between the locking and cam surfaces. Pivotal movement of a manual knob relieves the cam members of the spring bias to release the slides from their wedged condition and thereby allow pivotal adjustment of the seat back support in an infinite position manner.

14 Claims, 10 Drawing Figures

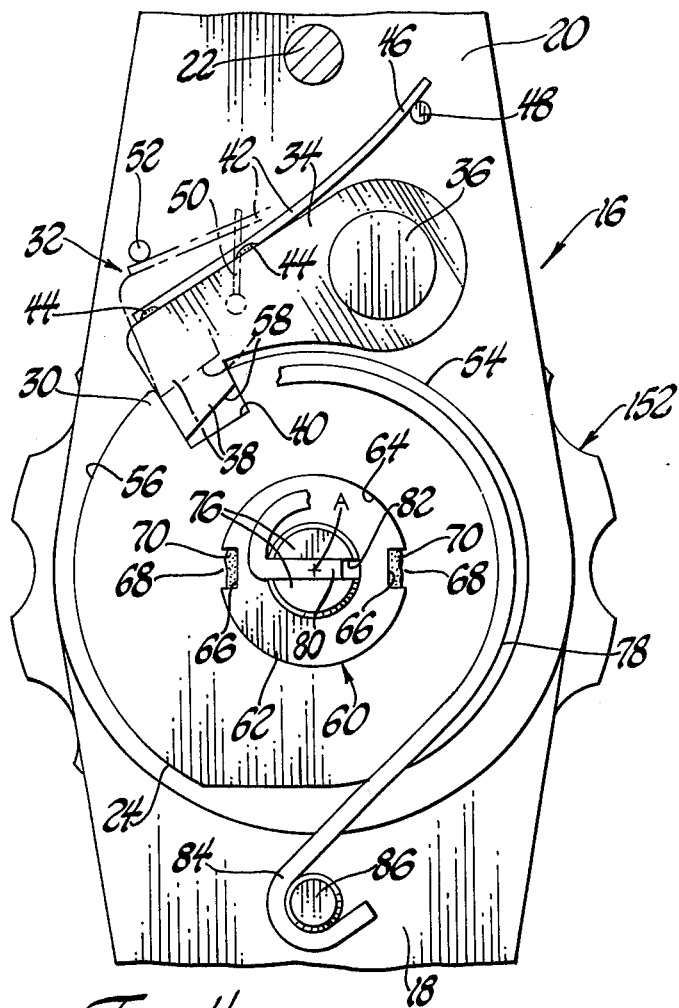
Fig. 4
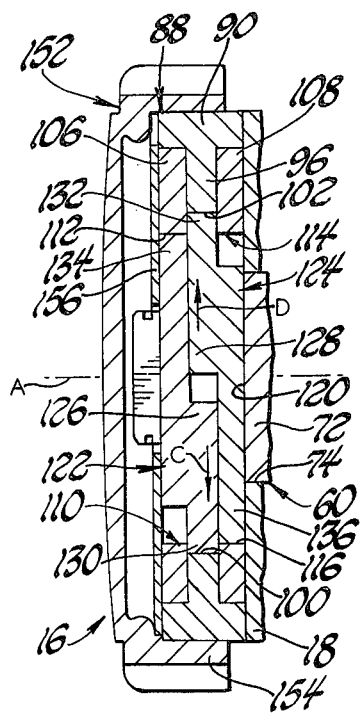
Fig. 6
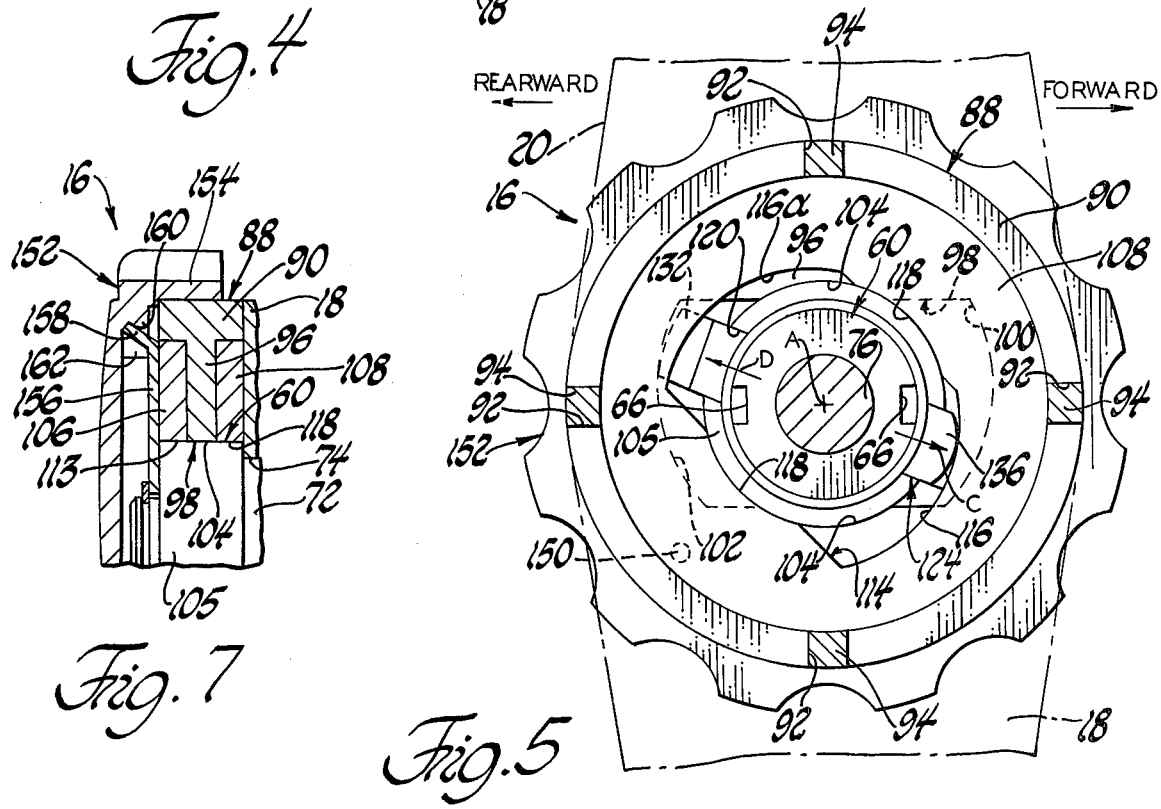
Fig. 7
Fig. 5

INFINITE POSITION SEAT BACK RECLINER

BACKGROUND OF THE INVENTION

1. Field of the Invention

The present invention relates to a recliner for pivotally locating a vertical seat back with respect to an associated horizontal seat cushion in an adjustable manner.

2. Description of the Prior Art

Seat recliners are used with vehicle seats to control the angular orientation of a vertical seat back with respect to an associated horizontal seat cushion. Adjustment of the angular orientation of the back with respect to the cushion affords a vehicle driver or passenger comfort in assuming a position that meets with the seat occupant's size and desired position while seated. Conventionally, recliners have been limited in the number of positions to which the seat back can be orientated with respect to the seat cushion. Also, when utilized with front seats in a vehicle of the "two-door" type, the seat back must be able to pivot forwardly independently of the seat cushion to an easy-enter position to allow a person to enter or leave the rear seat behind the front seat.

SUMMARY OF THE INVENTION

An object of the present invention is to provide an improved seat recliner that permits angular adjustment of a vehicle seat back with respect to an associated seat cushion in an infinite position adjustment manner.

In carrying out the above object and other objects of the invention, the recliner includes seat back and cushion supports respectively adapted for attachment to a seat back and cushion and pivotally connected to each other for movement about a pivotal axis. A housing is fixed to one of the supports and includes a pair of locking surfaces that extend about the pivotal axis on opposite sides of the axis. A pair of cam members are pivotally supported on the housing for independent movement about the pivotal axis and include respective cam surfaces positioned on opposite sides of the axis in opposed relationships to the locking surfaces of the housing mounted on the one support. A pair of locking slides are pivotally fixed on the other support for sliding movement relative thereto, and each slide has a first end slidably engaged with one of the locking surfaces on the housing and a second end slidably engaged with the cam surface on the opposite side of the pivotal axis from its first end. The locking and cam surfaces engaged with one of the slides have configurations that wedge this slide therebetween to prevent relative pivoting of the supports with respect to each other in one direction. Likewise, the locking and cam surfaces engaged with the other slide have configurations that wedge this slide therebetween to prevent relative pivoting between the supports in the other direction. A spring normally biases the cam members in opposite directions about the pivotal axis to maintain the slides in their wedged condition between the cam and locking surfaces. A manual knob is provided to selectively move either cam member against the spring bias so as to unwedge the associated locking slide and thereby allow pivoting of the seat back support relative to the seat cushion support in the same direction that the cam member is moved. The seat back support is positionable by the cooperable action of the slides with the locking and cam surfaces in an infinite position adjustable manner.

The preferred construction of the recliner includes a housing having an annular outer portion and an intermediate plate portion. Each cam member has a plate-like construction and is located on the opposite side of the housing plate portion from the other cam member. Annular outer edges of the cam members are slidably engaged with the annular outer portion of the housing so that the cam members are supported for pivotal movement about the axis along which the supports pivot relative to each other. An opening in the housing plate portion defines its locking surfaces while openings in the plate-like cam members define their cam surfaces. The openings of the cam members and the housing plate portion also have journal surfaces slidably engaging a journal which defines a slideway that receives the locking slides. The journal pivots relative to the support on which the housing is mounted and is fixed with respect to the other support.

In their preferred construction, the locking slides include intermediate portions that overlap each other axially with respect to the pivotal axis. The first locking slide ends slidably engaged with locking surfaces are axially aligned with respect to the pivotal axis, while the second ends of the slides are axially spaced with respect to the pivotal axis on opposite sides of the housing plate portion to slidably engage the cam surfaces of the associated cam members. Also, the plate-like cam member construction is preferably made with the opening of each cam member the same as the other cam member to minimize tooling expense. The spring that biases the cam members includes an intermediate portion snapped over the journal and a pair of spring legs respectively engaged with a pair of pins mounted on the cam members. Actuating portions of the manual knob move the pins against the bias of the spring legs upon movement of the knob to provide the release of the locking slides for adjustment of the recliner. A disc of the knob defines slots that receive the cam member pins so as to function as the actuating portions which move the cam members. An outer periphery of the knob is supported for movement of the annular outer portion of the housing about the pivotal axis, while cooperable stop surfaces on the housing and the knob limit the extent of knob movement.

The objects, features and advantages of the present invention are readily apparent from the following detailed description of the preferred embodiment taken in connection with the accompanying drawings.

BRIEF DESCRIPTION OF THE DRAWINGS

FIG. 4 is a view of the recliner taken along line 4—4 of FIG. 3;

FIG. 5 is a view of the recliner taken along line 5—5 of FIG. 3 partially in section;

FIG. 6 is a view of the recliner taken along line 6—6 of FIG. 10 partially in section;

FIG. 7 is a partial sectional view of the recliner taken along line 7—7 of FIG. 2;

DETAILED DESCRIPTION OF THE PREFERRED EMBODIMENT

Figure 1:
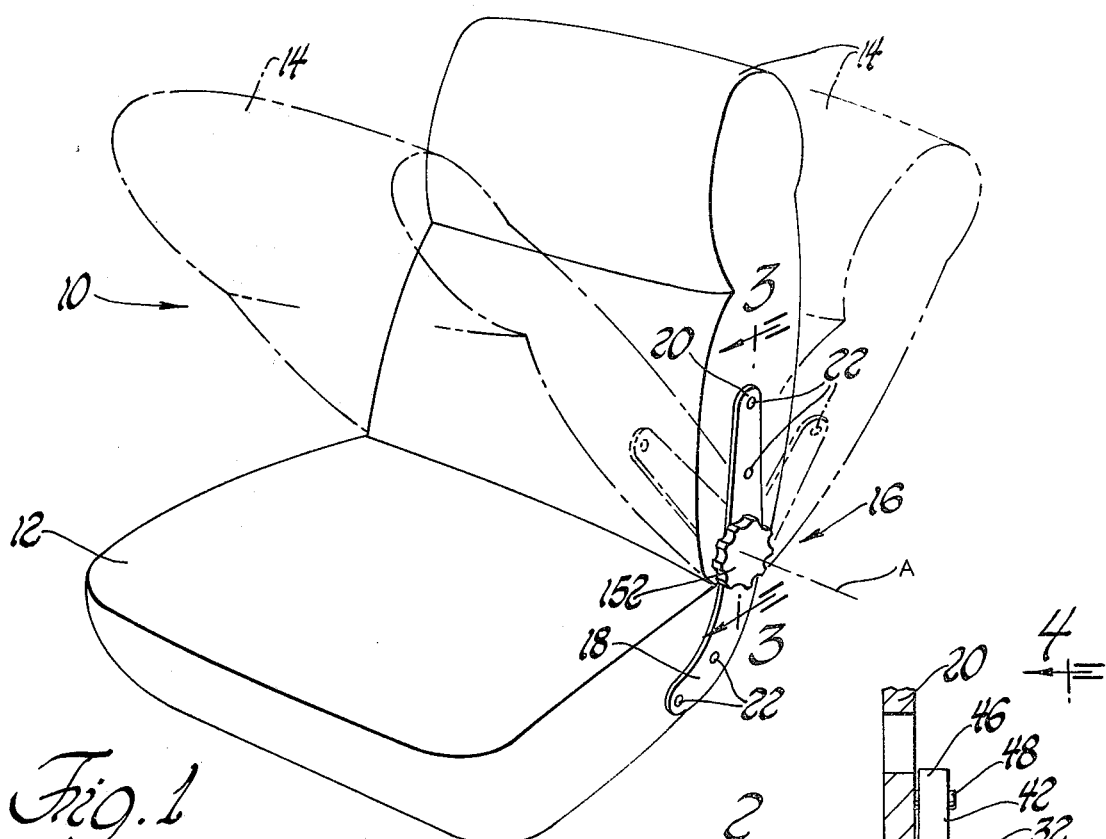
FIG. 1 is a perspective view of a seat whose horizontal seat cushion and tiltable seat back are positioned by a recliner constructed according to the present invention.

Referring to FIG. 1, a vehicle seal indicated generally by 10 includes a generally horizontal seat cushion 12 and a vertical seat back 14. Unshown frames of the seat cushion 12 and seat back 14 are pivotally interconnected along an axis A so that the seat back can pivot relative to the seat cushion between the solid and phantom line indicated positions. A recliner indicated generally by 16 and constructed according to the present invention is utilized to position the seat back 14 relative to the seat cushion 12. As is more fully hereinafter described, the recliner 16 positions the seat back 14 in either the upright seating position shown by solid lines or in the rearwardly inclined position shown by phantom lines as well as an infinite number of positions between these two. Also, the recliner 16 allows the seat back 14 to be tipped forwardly to a phantom line easy-enter position that allows the seat 10 to be used as a front seat of a "two-door" type vehicle in order to permit convenient entrance to and exit from a rear seat behind the front seat through an adjacent side door opening. In providing its positioning function, the recliner 16 includes a seat cushion support 18 and a seat back support 20 that are pivotally connected to each other about the pivotal axis A and respectively secured to the frames of seat cushion 12 and seat back 14 by associated pins 22.

Figure 3:
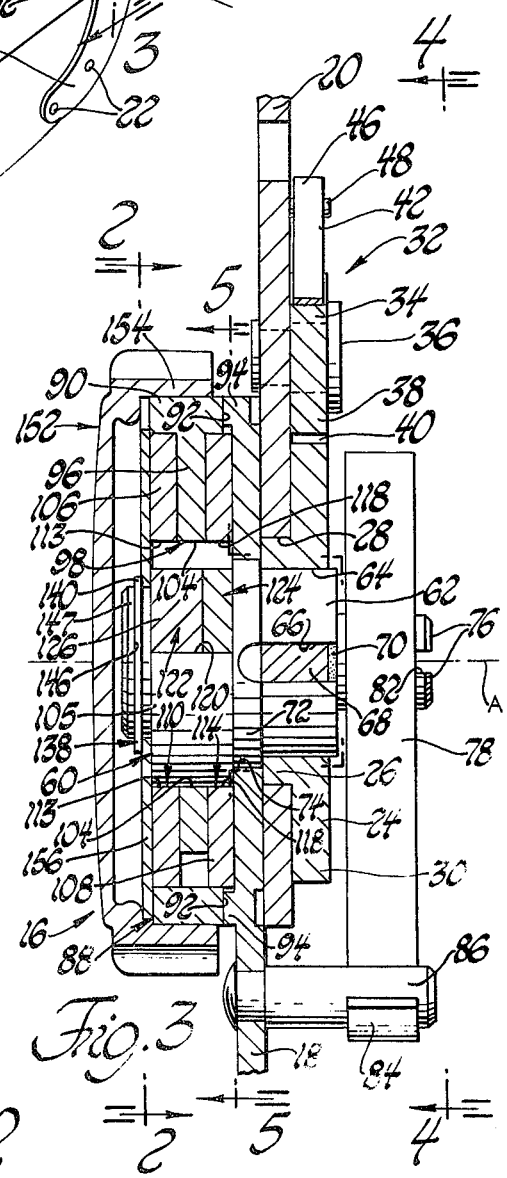
FIG. 3 is a sectional view of the recliner taken along line 3—3 of FIG. 1.

With combined reference to FIGS. 3 and 4, an annular bearing 24 of the recliner includes an axial portion 26 (FIG. 3) received within a round aperture 28 in the seat back support 20 concentric with the pivotal axis A. Bearing 24 also includes a radial flange 30 engaged with one side of seat back support 20 about its aperture 28. A latch 32 is provided to normally fix the bearing 24 with respect to the seat back support 20 about the pivotal axis A. The latch includes a latch member 34 pivoted to the seat back support by a pin 36 and having a projection 38 that is received within a notch 40 of the bearing flange 30 in order to fix the seat back support 20 relative to the bearing. A leaf spring 42 secured to the latch member 34 by welds 44 has an end 46 engaged with a pin 48 on the seat back support 20 so that a straightening bias of the spring normally locates the latch member in its latching position shown by solid lines in FIG. 4. A suitable cable 50 or the like is used to move the latch member 34 to the nonlatching position shown by phantom lines in FIG. 4 under the limit of a stop pin 52 on the seat back support 20.

With the latch member 34 in its phantom line nonlatching position of FIG. 4, the seat back support 20 can pivot forwardly to the easy-enter position shown in FIG. 1. As this pivoting proceeds, the latch member projection 38 slides along a bearing flange surface 54 (FIG. 4) on the clockwise side of notch 40. Counterclockwise of notch 40, the bearing flange 30 has an outer surface 56 that is of a slightly greater radius than surface 54. The counterclockwise side of notch 40 thus provides a stop for limiting the rearward pivoting of the seat back support 20 from the forward easy-enter position. In this connection, it should be noted that the latch member projection 38 has an angular surface 58 that facilitates the initial forward sliding movement of the projection along the bearing flange surface 54.

A journal 60 of the recliner is shown in FIGS. 3 and 4 as including a round projection 62 received within a round opening 64 of the bearing 24 concentric with axis A. A pair of diametrically opposed slots 66 in the journal projection 62 respectively receive inwardly extending tangs 68 on the bearing 24 with welds 70 securing the journal projection to the bearing. To the left of the projection 62 as viewed in FIG. 3, journal 60 includes a round intermediate portion 72 received within a round aperture 74 of the seat cushion support 18. The round intermediate journal portion 72 and the round aperture 74 are concentric about axis A so that the seat back support 20 pivots relative to the seat cushion support 18 about this axis. To the right of journal projection 62 as viewed in FIG. 3, journal 60 includes an end portion 76 that is biased by a counterbalance spring 78 so that the journal moves the seat back support 20 in a forward direction in a manner that is described later. Spring 78 is of the spiralling clock type and, as seen in FIG. 4, has an inner end 80 received within a slot 82 of the journal end portion 76 as well as including an outer hooked end 84 engaged with a pin 86 on the seat cushion support 18. The normal unwinding tendency of spiralling spring 78 thus provides the bias that moves the journal 60 and the seat back support 20 forwardly when the latch 32 fixes the seat back support with respect to the bearing 24 and the journal affixed thereto.

Figure 10:
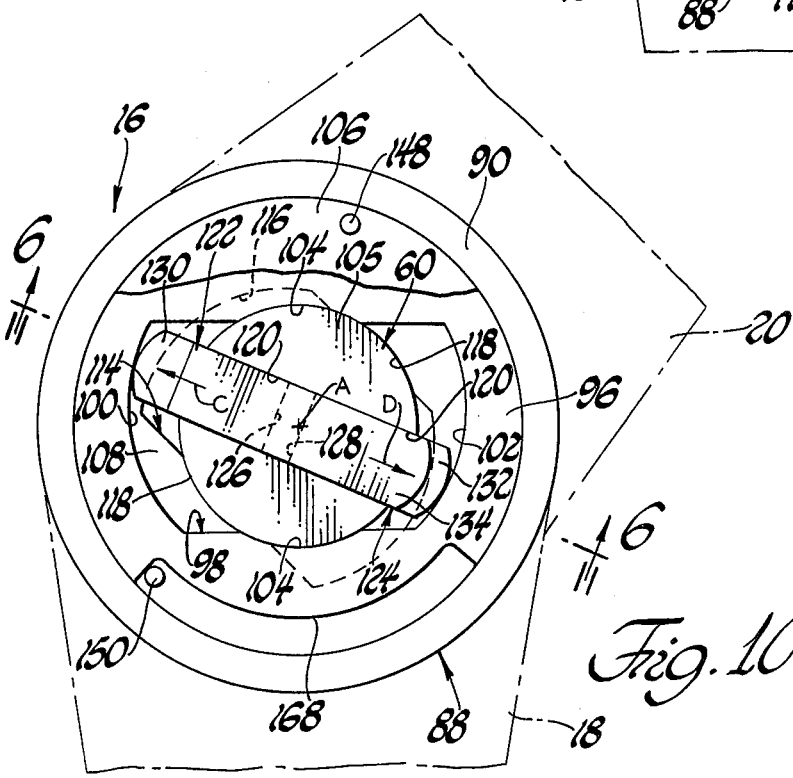
FIG. 10 is a view similar to FIG. 9 but with the seat back support further reclined rearwardly and with a cam member thereof partially broken away.

A housing 88 of recliner 16 is shown in FIGS. 3 and 5 as including an annular outer portion 90 positioned on the opposite side of seat cushion support 18 from the seat back support 20. Four circumferentially spaced slots 92 in housing portion 90 receive associated stamped lugs 94 on the seat cushion support 18 so that the housing is pivotally fixed with respect to the seat cushion support concentric about axis A. Within the annular shape of outer housing portion 90, the housing 88 also includes an intermediate plate portion 96 from which the outer portion projects axially in both directions along the direction of axis A. Housing plate portion 96, as can be seen in FIG. 10, includes an opening 98 that defines a pair of curved locking surfaces 100 and 102 on opposite sides of the pivotal axis A. Locking surface 100 extends away from pivotal axis A with increasing radii in a clockwise direction about the axis, while locking surface 102 extends away from the axis with increasing radii in a counterclockwise direction. Intermediate the locking surfaces 100 and 102, the housing plate portion opening 98 defines a pair of diametrically opposed round journal surfaces 104 that slidably engage the outer surface on a round support portion 105 of journal 60 in a concentric relationship about axis A.

Figure 8:
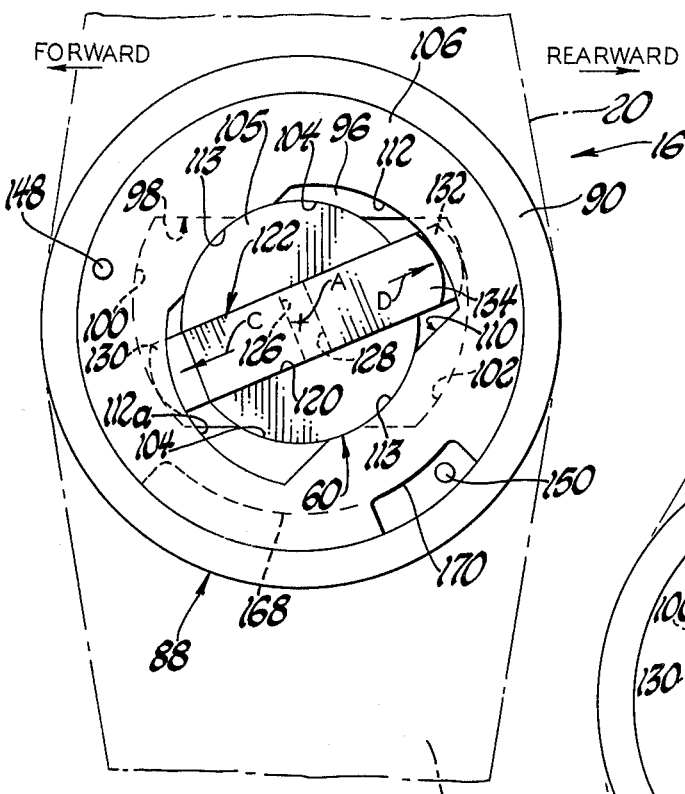
FIG. 8 is a view of the recliner taken in a direction similar to FIG. 2 but with certain components removed to show the manner in which the recliner maintains the seat back support in its upright position shown.

As seen by combined reference to FIGS. 3, 5, and 8, a pair of cam members 106 and 108 are located on opposite sides of the housing plate portion 96 and have round outer peripheral edges slidably engaged with the annular outer housing portion 90 so as to pivot relative thereto about axis A independently of each other. Cam member 106 includes an opening 110 (FIG. 8) that defines a curved cam surface 112 located on the opposite side of pivotal axis A from the curved locking surface 100 of the housing in an opposed relationship. The curved shape of cam surface 112 extends away from the pivotal axis A with increasing radii in the FIG. 8 clockwise direction as does the housing locking surface 100. At diametrically opposed positions relative to axis A, cam member opening 110 also defines round journal surfaces 113 that slidably engage and support the journal support portion 105. Likewise, as seen in FIG. 5, cam member 108 also includes an opening 114 that defines a curved cam surface 116 on the opposite side of pivotal axis A from the housing locking surface 102 in an opposed relationship. The curved shape of cam surface 116 extends away from pivotal axis A with increasing radii in the FIG. 5 clockwise direction as does the locking surface 102. Cam member opening 114 also defines diametrically opposed journal surfaces 118 that slidably engage the journal support portion 105 in a concentric relationship about axis A. To minimize tooling expense, the respective openings 110 and 114 of cam members 106 and 108 have the same shape as each other. Thus, the surface 112a (FIG. 8) of the opening 110 in cam member 106 is the same as the cam surface 116 of the opening 114 in cam member 108 as seen in FIG. 5. Similarly, the surface 116a shown in FIG. 5 opposite cam surface 116 is the same as the cam surface 112 shown in FIG. 8. During operation of the recliner, as is hereinafter more fully described, the cam members move with each other so that their openings 110 and 114 are oriented at the same locations about axis A.

With combined reference to FIGS. 5, 6 and 8, journal support portion 105 includes a slot 120 extending diametrically through the pivotal axis A so as to provide a slideway for a pair of elongated locking slides 122 and 124. The locking slides 122 and 124 are pivotally fixed relative to journal 60 within slideway slot 120 but are movable in a slidable menner along their lengths in the directions of arrows C and D. Respective intermediate portions 126 and 128 of slides 122 and 124 axially overlap each other with respect to the pivotal axis A. A first end 130 of slide 122 slidably engages the housing locking surface 100 while a first end 132 of slide 124 slidably engages the housing locking surface 102, and these slide ends 130 and 132 are in axial alignment with each other along the pivotal axis A. A second end 134 of the slide 122 slidably engages the cam surface 112 of cam member 106 on the FIG. 6 left-hand side of housing plate portion 96. A second end 136 of slide 124 slidably engages the cam surface 116 of cam member 108 on the FIG. 6 right-hand side of housing plate portion 96. The second slide ends 134 and 136 are axially spaced with respect to each other along the pivotal axis A.

Figure 2:
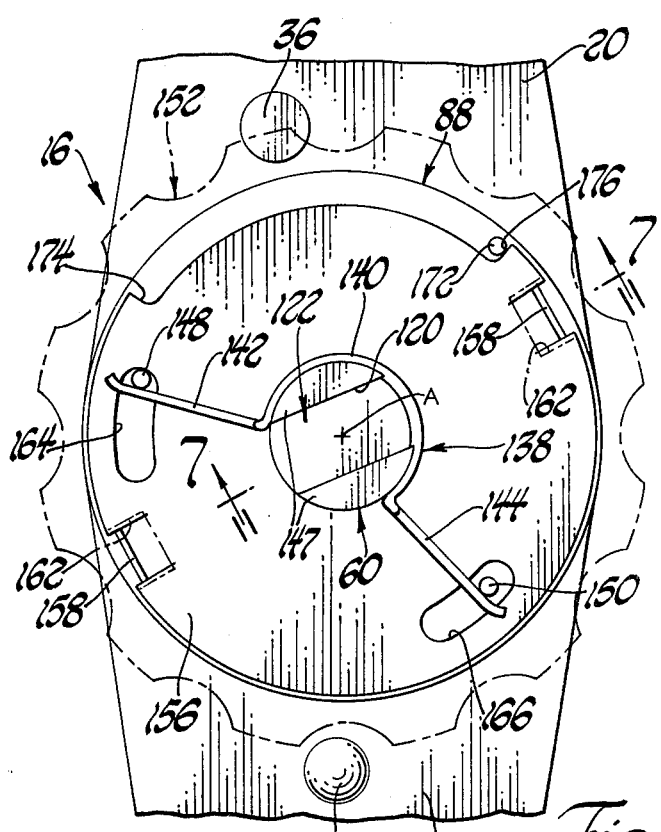
FIG. 2 is a view of the recliner taken along line 2—2 of FIG. 3 with a manual knob for adjusting the recliner removed.

A biasing spring 138 of the recliner is shown in FIG. 2 as including a partially circular intermediate portion 140 and a pair of spring legs 142 and 144 projecting from the intermediate portion. The intermediate spring portion 140 is flattened and snapped into a groove 146 (FIG. 3) in an end portion 147 of journal 60 so as to be pivotal relative thereto. Spring leg 142 is engaged with a pin 148 carried by the cam member 106 while the spring leg 144 is engaged with a pin 150 carried by the cam member 108. Spring legs 142 and 144 are flexed in their FIG. 2 position and respectively bias pins 148 and 150 in clockwise and counterclockwise directions toward each other to provide a bias to the cam members 106 and 108 in opposite directions.

A manual adjustment knob 152 of recliner 16 is shown in FIGS. 1 through 3 and includes an annular edge portion 154 (FIG. 3) slidably engaged with the annular outer portion 90 of housing 88 so that the knob is pivotally movable about axis A. A disc 156 of knob 152 is shown in FIGS. 2 and 3 and has one side thereof engaged with the annular outer housing portion 90 and the cam member 106 and the other side thereof engaged by the intermediate spring portion 140 to secure the disc in position. After securement of disc 156, the knob 152 is positioned over the recliner housing 88 as shown in FIG. 3. Diametrically opposed tabs 158 of disc 156 are shown in FIG. 2 and are bent, as shown by FIG. 7, so as to be snapped over an annular bead 160 of knob 152 in a manner that secures the knob. The tabs 158 are also received within associated grooves 162 (FIG. 2) of the knob as it is positioned over the housing so that the disc 156 pivots with the knob. Curved slots 164 and 166 of disc 156, as seen in FIG. 2, respectively receive the pins 148 and 150 carried by cam members 106 and 108. Cam member 106 is located immediately adjacent the disc 156 so that its pin 148 extends directly through the associated disc slot 164. The pin 150 of cam member 108 extends through a curved slot 168 (FIG. 10) in the housing plate portion 96 and through a smaller curved slot 170 (FIG. 8) in the cam member 106 to be received within its associated disc slot 166 as shown in FIG. 2. Pivoting of the knob 152 causes the disc slot 164 or 166 to move the cam member pin 148 or 150, depending on the direction of knob movement, so as to relieve the cam members of their spring bias in order to provide adjustment of the angular position of seat back support 20 about axis A.

With the seat back support 20 in its upright position shown in FIGS. 1 and 2, biasing spring 138 biases cam member pins 148 and 150 in opposite directions so that their associated cam members 106 and 108, shown respectively in FIGS. 8 and 5, cooperate with the slides 122 and 124 to prevent movement of the seat back support. Cam member 106 is then biased clockwise, as shown in FIG. 8, and its cam surface 112 then urges the end 134 of slide 122 in the direction of arrow C so that its end 130 pushes against the locking surface 100 on housing 88. Cam member 108 is biased in a clockwise direction, as viewed in FIG. 5, and its cam surface 116 urges the end 136 of slide 124 in the direction of arrow D so that its end 132 pushes against the locking surface 102 of housing 88. Forward pivoting of the seat back support 20 is resisted by the slide 122 shown in FIG. 8. This forward pivoting tends to cause journal 60 to rotate slide 122 in a counterclockwise direction about axis A. However, for the counterclockwise rotation of slide 122 to proceed, its end 130 engaged with the housing locking surface 100 must move toward the pivotal axis A as it slides in a counterclockwise direction due to the shape of this locking surface. Thus, slide 122 tends to be slid relative to journal 60 along the direction of arrow D. For this sliding to proceed, the other slide end 134 of slide 122 must move along the cam surface 112 in a clockwise direction relative thereto; but, this is a direction opposite to the direction that the journal 60 tends to rotate the slide. The net effect is that slide 122 is wedged between the housing locking surface 100 and the cam member surface 112 to prevent forward pivoting of seat back support 20. Likewise, the slide 124, shown in FIG. 5, prevents rearward pivoting of seat back support 20 in a counterclockwise direction. Forces tending to pivot the seat back support 20 in the rearward direction urge the journal 60 counterclockwise as viewed in FIG. 5 so that the end 132 of slide 124 is urged in a counterclockwise direction along locking surface 102 and, due to the shape of this locking surface, the slide is thereby urged to slide in the direction of arrow C. However, the other end 136 of slide 124 is engaged with the cam surface 116 which allows movement of the slide along arrow C only when the slide is rotated clockwise. Consequently, the net effect is that slide 124 is wedged between surfaces 102 and 116 so as to lock the seat back support 20 against rearward pivoting.

Figure 9:
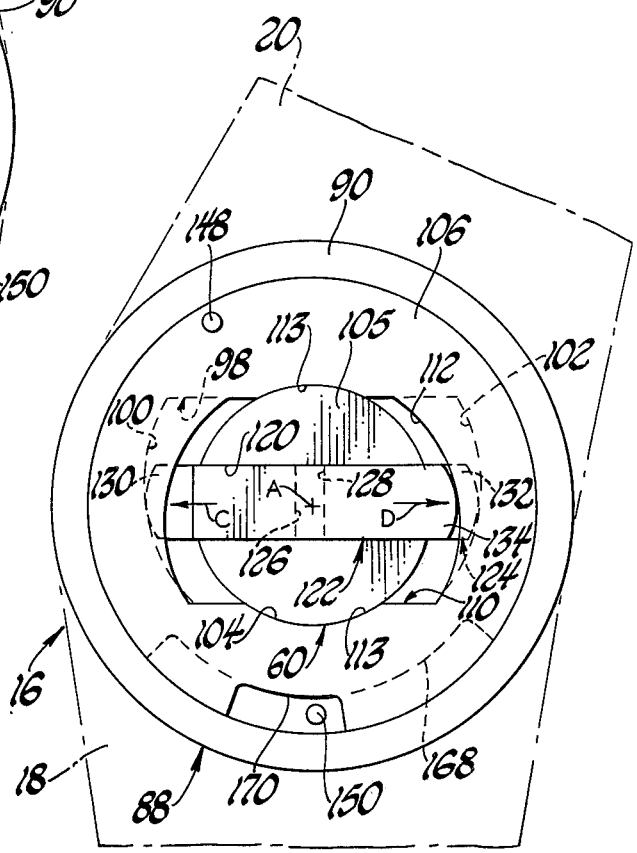
FIG. 9 is a view similar to FIG. 8 but with the seat back support pivoted rearwardly to a reclined position.

Recliner 16 is adjustable in an infinite position fashion from its vertical position shown by solid lines in FIG. 1 to rearwardly inclined positions as desired by the seat occupant for maximum comfort. To achieve rearward adjustment, the occupant grasps the manual adjustment knob 152, shown in FIGS. 2 and 3, and rotates this knob in a clockwise direction corresponding to the direction of seat back movement rearwardly. The clockwise knob rotation, as viewed in FIG. 2, causes the slot 166 to engage pin 150 and rotate the cam member 108 connected to this pin in a counterclockwise direction as viewed in FIG. 5. As cam member 108 moves in this direction, its cam surface 116 slides upwardly relative to the end 136 of slide 124 and thereby allows rearward movement of seat back support 20 as journal 60 is rotated by the occupant's back pressure in a rearward direction. Concomitantly, the slide end 132 of slide 124 moves downwardly along the locking surface 102 of the recliner housing and the slide continuously moves in the direction of arrow C in the journal slideway slot 120 to maintain a constantly engaged condition of its end 136 with the cam surface 116. FIG. 9 shows the position that the journal 60 and its slides 122 and 124 assume in a partially reclined position. These slides cooperate with their associated locking and cam surfaces in the same manner previously discussed to then prevent forward or rearward movement of seat back support 20 in the same manner from this partially reclined position. Likewise, the recliner is movable to the fully reclined position of FIG. 10 where the slides continue to cooperate with the locking and cam surfaces to prevent seat back tilting in either direction.

As seen in FIG. 2, a stop pin 172 on the housing portion 90 has an outer stop surface that engages a stop surface 174 of the knob disc 156 to limit the clockwise rotation of knob 152 and the extent of the rearward seat back pivoting. Knob 152 is also rotatable in a counterclockwise direction as viewed in FIG. 2 to permit forward seat back tilting adjustment with the stop pin 172 engaging a stop surface 176 as shown to limit the extent of this movement. As knob 152 is rotated counterclockwise its disc slot 164 engages pin 148 and thereby moves the cam member 106 (FIGS. 8 and 9) connected thereto in a counterclockwise direction. As cam member 106 moves counterclockwise, its cam surface 112 slides upwardly along the end 134 of slide 122 and thereby permits this slide to move in the direction of arrow D so that its end 130 can move downwardly along locking surface 100 and permit the journal 60 to rotate counterclockwise. The counterbalance spring 78, shown in FIGS. 3 and 4, then rotates the seat back support 20 forwardly against the bias of gravity acting on the seat back so that there is forward adjustment of the seat back in an infinite position manner to the extent permitted by the degree of knob rotation.

As each cam member 106 and 108 is moved by knob 152 in the manner described above, the spring 138 (FIG. 2) pivots about journal end portion 147 so that spring legs 142 and 144 maintain the cam members at the same relative pivotal position as each other. Pivoting of the spring 138 relative to the journal 60 takes place during adjustment of the recliner since the cam members pivot relative to the housing 88 a different extent than the journal. The degrees of pivoting are controlled by the locking and cam surface shapes in cooperation with the locking slides in the manner described.

While a preferred embodiment of the recliner has been described in detail, those skilled in the art will recognize various alternative designs and embodiments for practicing the present invention as defined by the following claims.

What is claimed is:

1. A seat recliner comprising: seat back and cushion supports connected to each other for movement about a pivotal axis; a housing fixed to one of the supports and including a pair of locking surfaces extending about the pivotal axis on opposite sides thereof; a pair of cam members pivotal with respect to the housing and each other about the pivotal axis; said cam members having respective cam surfaces on opposite sides of the pivotal axis; a pair of locking slides mounted on the other support in a pivotally fixed manner for sliding movement with respect thereto; each of said slides having a first end slidably engaged with a respective locking surface on the housing and a second end slidably engaged with a respective cam surface on the opposite side of the pivotal axis from its first end; the locking and cam surfaces engaged with one of the slides having configurations that wedge said one slide therebetween to prevent relative pivoting of the supports in one direction; the locking and cam surfaces engaged with the other slide having configurations that wedge said other slide therebetween to prevent relative pivoting between the supports in the other direction; and spring means operatively associated with the cam members to normally maintain the wedged condition of the locking slides between the locking and cam surfaces to prevent relative pivoting of the supports in either direction while permitting selective releasing of the slides from the wedged condition to permit such pivoting and consequent infinite position adjustment of the pivotal location of the supports with respect to each other.

2. A recliner as in claim 1 wherein the housing includes an annular outer portion and an intermediate plate portion having an opening that defines the locking surfaces, the cam members being located on opposite sides of the housing plate portion, and each cam member having a plate-like construction including an annular outer edge slidably engaged with the outer portion of the housing.

3. A recliner as in claim 2 wherein the locking slides include intermediate portions that overlap each other axially with respect to the pivotal axis, the first ends of the slides projecting from their associated intermediate portions in axial alignment with respect to the axis, and the second ends of the slides projecting from their associated intermediate portions in an axial spaced relationship with respect to the axis on opposite sides of the housing plate portion.

4. A recliner as in claim 3 wherein each cam member includes an opening defining its cam surface.

5. A recliner as in claim 4 wherein the openings of both cam members are congruent.

6. A recliner as in claim 4 wherein the openings of the housing plate portion and each cam member have round journal surfaces, a round journal on the support with which the locking slides pivot, said journal defining a slideway that receives the locking slides, and the journal having a round outer surface slidably engaged with the journal surfaces of the housing plate portion and the cam members.

7. A recliner as in claim 6 further including a manual knob pivotally mounted on the annular outer portion of the housing for movement in opposite directions and having a pair of actuating portions for acting against the spring means to release one slide or the other slide depending upon the direction of knob movement.

8. A recliner as in claim 7 wherein the spring means includes a spring having an intermediate portion encircling the pivotal axis and a pair of spring legs projecting from the intermediate portion to engage and bias the cam members in opposite directions.

9. A recliner as in claim 8 wherein each cam member includes a pin engaged with an associated spring leg, and the actuating portions of the knob being respectively engageable with the cam member pins to move each pin and the cam member connected thereto against the bias of the associated spring leg.

10. A recliner as in claim 9 further including a latch on one of said supports for normally connecting the seat back support for positioning relative to the cushion support under the control of the cam and locking surfaces in cooperation with the locking slides, and the latch being releasable to allow the seat back support to pivot independently of the cushion support so that an associated seat back can move to a forward easy-enter position.

11. A recliner as in claim 9 wherein the knob includes a disc and said actuating portions comprising slots in the disc for respectively receiving the cam member pins.

12. A recliner as in claim 9 wherein the housing and the knob include cooperable stop surfaces for limiting the pivotal knob movement.

13. A recliner comprising: seat back and cushion supports connected to each other for movement about a pivotal axis; a housing fixed to one of the supports and including a plate portion having an opening that defines a pair of locking surfaces on opposite sides of the pivotal axis; each locking surface having a curved shape that extends away from the pivotal axis in a direction thereabout opposite to the other locking surface; a pair of plate-like cam members located on opposite sides of the housing plate portion; said cam members being pivotal with respect to the housing and each other about the pivotal axis and having respective openings that define cam surfaces thereof on opposite sides of the pivotal axis in opposed relationships to the locking surfaces of the housing plate portion; a journal fixed to the other support and defining a slideway through the pivotal axis; a pair of locking slides received within the journal slideway so as to be pivotally fixed with respect to the other support but movable relative thereto in a sliding manner through the pivotal axis; each locking slide having a first end slidably engaged with a respective locking surface of the housing plate portion and a second end slidably engaged with the cam surface on the opposite side of the pivotal axis from its first end such that the slides prevent relative pivoting between the supports in either direction; a spring operatively associated with the cam members to provide biasing thereof in opposite directions about the pivotal axis to maintain the slides engaged with the cam and locking surfaces in a wedged condition so as to prevent pivoting of the supports relative to each other; and a manual knob on the housing for pivoting either cam member against the bias of the spring so as to release the slide engaged with the cam surface thereof from its wedged condition and thereby allow pivotal infinite position adjusting movement of the seat back support relative to the seat cushion support in a direction corresponding to the cam member movement.

14. A recliner comprising: seat back and cushion supports connected to each other for movement about a pivotal axis; a housing fixed to one of the supports and including an annular outer portion extending about the pivotal axis; said housing also including an intermediate plate portion having an opening that defines a pair of locking surfaces on opposite sides of the pivotal axis and a pair of round journal surfaces between the locking surfaces; each locking surface having a curved shape that extends away from the pivotal axis in a direction thereabout opposite to the other locking surface; a pair of plate-like cam members respectively located on opposite sides of the housing plate portion and having round peripheries slidably engaged with the annular outer housing portion so as to pivot with respect to the housing about the pivotal axis independently of each other; said cam members having openings that define cam surfaces thereof on opposite sides of the pivotal axis in opposed relationships to the locking surfaces of the housing plate portion; the cam member openings also defining round journal surfaces about the pivotal axis; a journal fixed to the other support and received within the cam member and housing plate portion openings in slidable engagement with the round journal surfaces thereof; said journal defining a slideway extending through the pivotal axis; a pair of locking slides received within the journal slideway so as to be pivotally fixed with respect to the other support but movable relative thereto in a slidable manner through the pivotal axis; the locking slides having intermediate portions that axially overlap along the pivotal axis as well as including axially aligned first ends that respectively engage the locking surfaces on the housing plate portion in a slidable manner and axially spaced second ends that respectively engage the cam surfaces in a slidable manner on opposite sides of the housing plate portion and on opposite sides of the pivotal axis from their first ends; spring means operatively associated with the cam members to provide biasing thereof in opposite directions to wedge the locking slides between the cam surfaces thereof and the locking surfaces of the housing so as to prevent pivotal movement of the supports relative to each other in either direction; and a manual knob on the housing for selectively moving either cam member against the bias of the spring means so as to release one of the locking slides from its wedged condition and thereby allow infinite position pivotal adjusting movement of the seat back support relative to seat cushion support in a direction corresponding to the cam member movement.

* * * * *